March 24, 1964 L. MARKOWITZ 3,126,177
IGNITION SYSTEM FOR ROCKET ENGINE
Filed April 16, 1962 3 Sheets-Sheet 1

INVENTOR.
LEONARD MARKOWITZ
BY
Curtis, Morris & Safford
ATTORNEYS

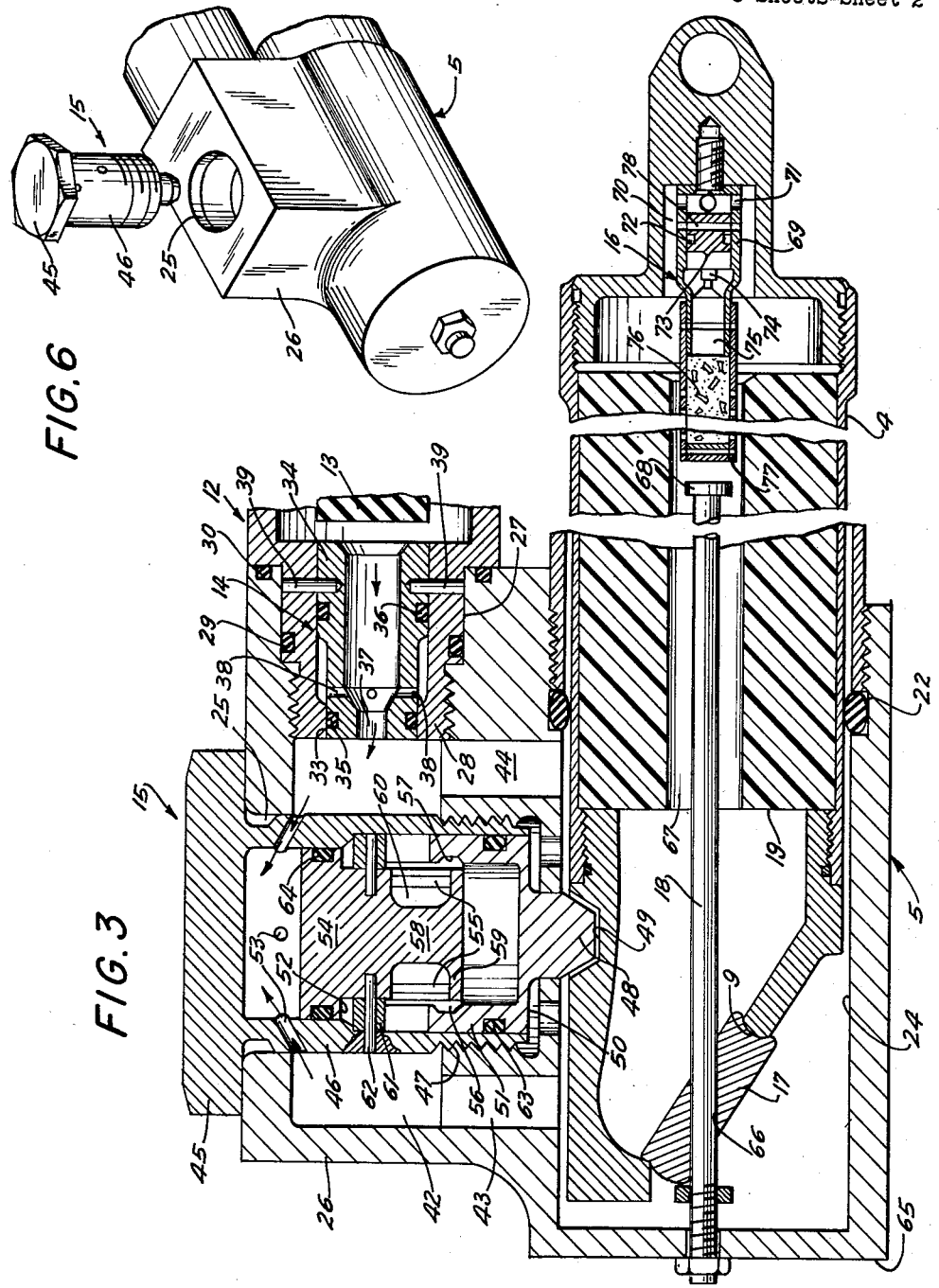

March 24, 1964

L. MARKOWITZ 3,126,177

IGNITION SYSTEM FOR ROCKET ENGINE

Filed April 16, 1962

INVENTOR.
LEONARD MARKOWITZ

BY

Curtis, Morris & Safford
ATTORNEYS

United States Patent Office 3,126,177
Patented Mar. 24, 1964

3,126,177
IGNITION SYSTEM FOR ROCKET ENGINE
Leonard Markowitz, Trevose, Pa., assignor to Thiokol Chemical Corporation, Bristol, Pa., a corporation of Delaware
Filed Apr. 16, 1962, Ser. No. 187,534
11 Claims. (Cl. 244—122)

The present invention relates to a catapult for ejecting rocket-powered devices, and more particularly to an improved apparatus for igniting the propellant of the rocket engine while it is being launched from the catapult.

While the present invention may have other applications, it is particularly useful for ejecting objects, such as a pilot and his seat, from high-speed jet aircraft. Such objects must be propelled from the aircraft so as to maintain a forward as well as an outward movement to clear the aircraft before the object is allowed to descend.

It has heretofore been proposed to provide a rocket engine for propelling an object as it leaves the aircraft and to initially launch the rocket engine from the aircraft by means of a catapult. In such catapult-launched rocket engines, it has been the practice to ignite the propellant for the engine by means of electrically actuated squibs and similar devices and the flare from the pyrotechnic materials within the squib is used to induce a chemothermic reaction in the main ignition device. To a lesser extent, a main ignition device has been used which is initiated by the introduction of high-temperature gases into the rocket engine. However, this latter method is not completely controllable because under certain conditions the propellant material in the engine is sometimes ignited along its length directly from the high-temperature gases before the desired reaction in the ignition device takes place. Under these circumstances the performance of the ejector engine is not directly predictable and determinant and for this reason the order of reliability usually is low.

One of the objects of the present invention is to provide a system for igniting a rocket engine as it is launched by a catapult which is actuated by the pressure of the medium used to operate the catapult.

Another object is to provide an ignition system for a catapult-propelled rocket engine for ejecting an object from an aircraft which is inherently automatic and self-determined and having an extremely high order of reliability.

Another object is to provide an improved construction in a catapult for launching a rocket engine which automatically opens the nozzle of the rocket engine after it has moved a predetermined distance to subject the igniting device to the pressure of the propelling gas in the catapult.

Still another object is to provide an ignition system of the type indicated which is of relatively simple and compact construction, economical to manufacture and safe to operate.

These and other objects will become more apparent from the following descriptions and drawings in which like-reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a side elevational view of a portion of an aircraft and partially broken away to show the rocket engine catapult of the present invention applied to the back of the pilot's seat;

FIGURE 2-A is a perspective view of the rear of the pilot's seat showing the normal position of the parts of the catapult;

FIGURE 2-B is a figure similar to FIGURE 2-A, showing the relationship of the rocket engine to its catapult after initial operation;

FIGURE 2-C is a view similar to FIGURE 2-A, showing the nozzle closure being stripped from the rocket engine during movement of the engine relative to the catapult casing;

FIGURE 2-D is a view similar to FIGURE 2-A, showing the rocket engine propellant ignited as the latter moves out of the catapult casing;

FIGURE 3 is an enlarged longitudinal section through the rearward end of the catapult casing and forward end of the rocket engine with the parts in the initial position illustrated in FIGURE 1;

FIGURE 6 is a perspective view of the rearward end of the catapult casing and showing the manner in which the locking device is removably applied to the catapult as a unit;

Figure 1:
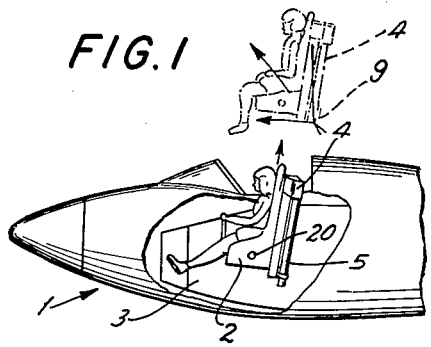
Figure 2A:
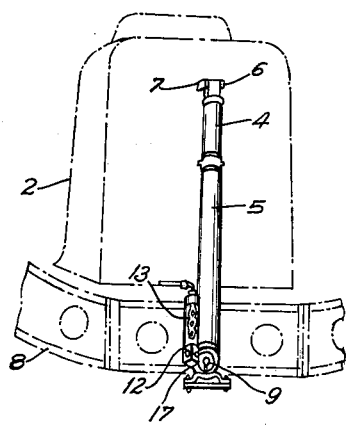
Figure 2B:
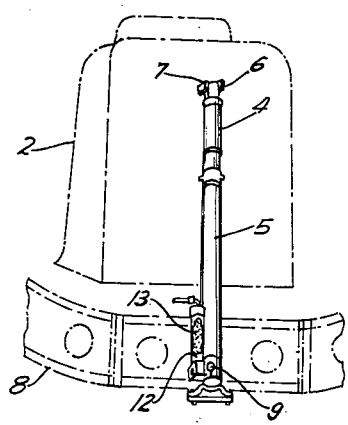
Figure 2C:
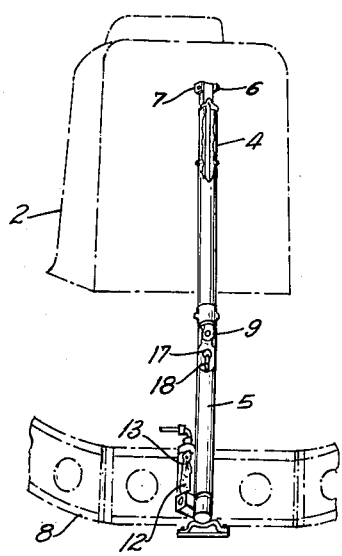
Figure 2D:
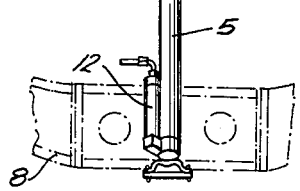

Referring first to FIGURES 1 and 2 of the drawings, the present invention is shown applied to an aircraft 1 for ejecting a pilot's seat 2 from the cockpit 3. It will be understood, however, that the present invention may be used to eject other objects from aircraft, such as cargo containers, canopies, hatches, or the like, or for other purposes. In the illustrated embodiment the pilot's seat 2 is ejected by a rocket engine 4 attached to the back of the seat. Rocket engine 4 is illustrated in the form of a tube mounted in a catapult casing 5 with its upper end projecting therefrom and connected to a suitable bracket 6 on the back of the pilot's seat by means of a pin 7. Catapult casing 5, on the other hand, is rigidly connected to the frame 8 of the aircraft, as clearly shown in FIGURES 2-A to 2-D. Rocket engine 4 and catapult casing 5 extend downwardly and forwardly along and parallel to the back of the pilot's seat 2, and the nozzle 9 of the rocket engine is directed downwardly and rearwardly, see FIGURES 1 and 2, to produce a force on the seat having upward and forward components. The rocket engine 4 and catapult casing 5 are illustrated as single tubes for convenience of illustration, but usually comprise plural tubes.

The improved ejecting system comprises in general a gas generator 12 containing a material 13 which produces gas at a rapid rate when burned, a flow control device 14 for limiting the pressure in the gas generator, a locking device 15 for locking the rocket engine 4 in the catapult casing 5, and passages interconnecting the parts to utilize the gas from the generator to operate the flow control device, the locking device and propel the rocket engine, see FIGURE 3.

The present invention includes an igniter 16 operable responsive to pressure, a closure 17 for nozzle 9, and a cooperating stripper 18 operated by the movement of the rocket engine for stripping the closure 17 from the socket engine nozzle 9 and which, together with the other elements, control the ignition of the propellant 19 in the rocket engine 4.

The gas generator 12 comprises a relatively small chamber, see FIGURES 2-A to 2-D, filled with the gas-producing material 13 which may be the same material as the solid rocket propellant material 19 used in the rocket engine 4, see FIGURE 3. The gas-producing material 13 may be ignited in any suitable way, such as by electrical ignition of a squibb, and controlled by a button 20 on the side of the pilot's seat, see FIGURE 1, or by any other suitable device under the manual control of the pilot. The gas so generated flows from the chamber 12 through the passages to operate the flow control device 14 when required, and the locking device 15 to release the rocket engine 4 and to the bore 24 in the catapult casing. The gas supplied to the catapult casing 5 acts on the rearward end of the rocket engine 4 and closure 17, which together constitute a piston, for initially propelling the engine relative to the casing from the position illustrated in FIGURE 2-A to that illustrated in FIGURE 2-B. As the rocket engine 4 moves relative to the catapult casing 5 and frame 8 of the aircraft, it also carries with it the pilot's seat 2. The movement of the rocket engine 4 continues relative to the catapult casing 5 until the stripping device 18 operates to withdraw the closure 17 from the nozzle 9 of the rocket engine 4, as illustrated in FIGURE 2-C. The high-pressure gases for propelling the rocket engine 4 then enter the rocket engine through the open nozzle 9 and produce a pressure shock wave therein. Igniter 16, operable in response to pressure, then ignites the rocket propellant 19 at the precise time required to propel the rocket engine 4 as its nozzle leaves the catapult casing 5.

As shown more in detail in FIGURES 3 to 6 of the drawings, the various elements of the catapult for controlling the rocket engine 4 are assembled in a single unit in the casing 5. Casing 5 has a cylindrical bore 24 in which the rocket engine 4 is mounted, a cylindrical bore 25 in a boss 26 and extending at right angles to the bore 24 for mounting the locking mechanism 15, and a cylindrical bore 27 in the boss 26 extending parallel to the cylindrical bore 24 for mounting the gas generator chamber 12. The gas generating chamber 12 has a reduced threaded nipple 28 at one end which is screwed into the boss 26 and the nipple and boss have cooperating offset annular shoulders with annular seals 29 and 30 between the parts. Similarly, the bore 24 has a seal 22 for cooperation with the periphery of the rocket motor 4.

The flow control device 14 is in the form of a hollow piston and mounted to slide in the nipple 28 of the gas generating chamber 12. As shown most clearly in FIGURE 3, the inside of the nipple 28 is countersunk to form an annular internal rim 33 at its outer end and the flow control piston has a diameter to closely fit the interior of the rim and an enlarged hub portion 34 adapted to closely fit the larger diameter of the nipple. O-rings 35 and 36 are provided between the offset portions of the piston and the nipple to seal the joints therebetween. Flow control piston 14 has an axial bore 37 through which the generated gas may flow, and a series of radial bores 38 for relieving the pressure acting on the piston when the latter is moved axially. Shear pins 39 extend through the flow control piston 14 and nipple 28 of the gas generating chamber 12 and the shear pins are of such size and number as to shear when a predetermined pressure is applied to the piston. When the pins 39 have sheared, the control piston 14 moves from the position illustrated in FIGURE 3 to that illustrated in FIGURE 4 to position the radial ports 38 outside the nipple 31 and thereby relieve the pressure. Relief of pressure in the gas generating chamber 12 reduces the rate of burning of the gas producing material 13. Thus, the relief of pressure by the flow control device 14 prevents excessive pressure in the gas generating chamber 12 and produces the desired lower pressure over a longer period of time by decreasing the burning rate.

Figure 7:
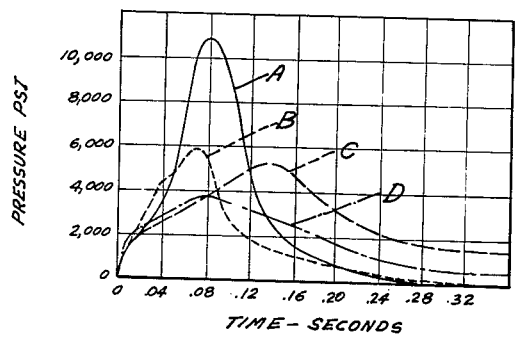
FIGURE 7 is a chart showing the effect of the flow control device between the gas generator and rocket engine to maintain a more uniform pressure over a longer period of time.

The chart in FIGURE 7 illustrates the relationship of the burning rate of the gas producing material 13 to the pressure in the generating chamber 12. In the chart, time in seconds is plotted against pressure. Curve A illustrates the excessive pressure produced with a single sonic flow orifice of 0.182 inch diameter in ambient temperatures of 200° F. as compared with curve B illustrating the lower the excessive pressure produced with a single sonic flow orifice arrangement having a primary orifice of 0.182 inch diameter and four secondary orifices of 0.050 inch diameter. When the single orifice is used a pressure in excess of 10,000 p.s.i. results, but when the two-stage orifice is used the peak pressure is less than 6,000 p.s.i. It will be observed also that the lower pressure curve B crosses the curve A and that a higher pressure is maintained for a longer period of time. The curves C and D correspond to curve A and B, but at an ambient temperature of −65° F. with the same single and double-stage flow orifices, respectively.

The boss 26 of the catapult casing 5 is cored to provide an annular chamber 42 around the locking device 15 and ports 43 and 44 extending from the chamber to the cylindrical bore 24 in the casing. Thus, gases from the generating chamber 12 flow through the flow control device 14 into the annular chamber 42 and then through the ports 43 and 44 into the bore 24 of the catapult casing to act on the rearward end of the rocket engine to propel it outwardly from the casing.

The locking device 15 is in the form of a nut having a hexagonal head 45 and a hollow shank 46 with a screw-threaded end 47 which is screwed into corresponding screw threads in bore 25 to mount the locking device in the boss 26 of the catapult casing 5. The locking device 15 is in the form of a bolt 48 projecting into a keeper groove 49 in the side of the rocket engine 4 to positively lock the engine 4 in the catapult casing 5. Bolt 48 projects from the circular end of a hollow piston 50 having an annular skirt 51 closely fitting the interior of the shank 46. Piston 50 and bolt 48 are held in the shank 46 so that the bolt 48 will project into the keeper 49 by means of a second piston 54 in the shank which overlies the lower piston 50. A series of tangs 55 extend between the pistons 50 and 54 and the tangs are provided with enlarged laterally projecting ends 56 projecting into a correspondingly shaped annular groove 57 in the interior of the skirt of the hollow piston 50. Depending from the piston 54 is a stem 58 having a flange 59 overlying the enlarged ends of the tangs 55 and normally preventing them from collapsing inwardly, but providing an annular recess 60 into which the ends of the tangs may collapse inwardly when the piston 54 moves downwardly with respect to the piston 50. The tangs 55 depend from an annular ring 61 surrounding a reduced portion of the piston 54 and the ring is connected to the piston 54 by a series of shear pins 62. At least one of the shear pins extends through the ring into the wall of the hollow shank 46. Pistons 50 and 54 are sealed to the inner wall of the shank 46 by O-ring seals 63 and 64. The annular wall of the hollow shank 46 also has a series of ports 53 extending upwardly at an angle from the annular chamber 42 to the space at the top of piston 54 and the end of piston 50 is subjected to the pressure of the gas flowing through the ports 43 and 44 into the cylindrical bore 24. As will be observed in FIGURE 3, the wall of the hollow shank 46 is stepped so that the piston 50 has a slightly larger area than the piston 54.

Figure 4:
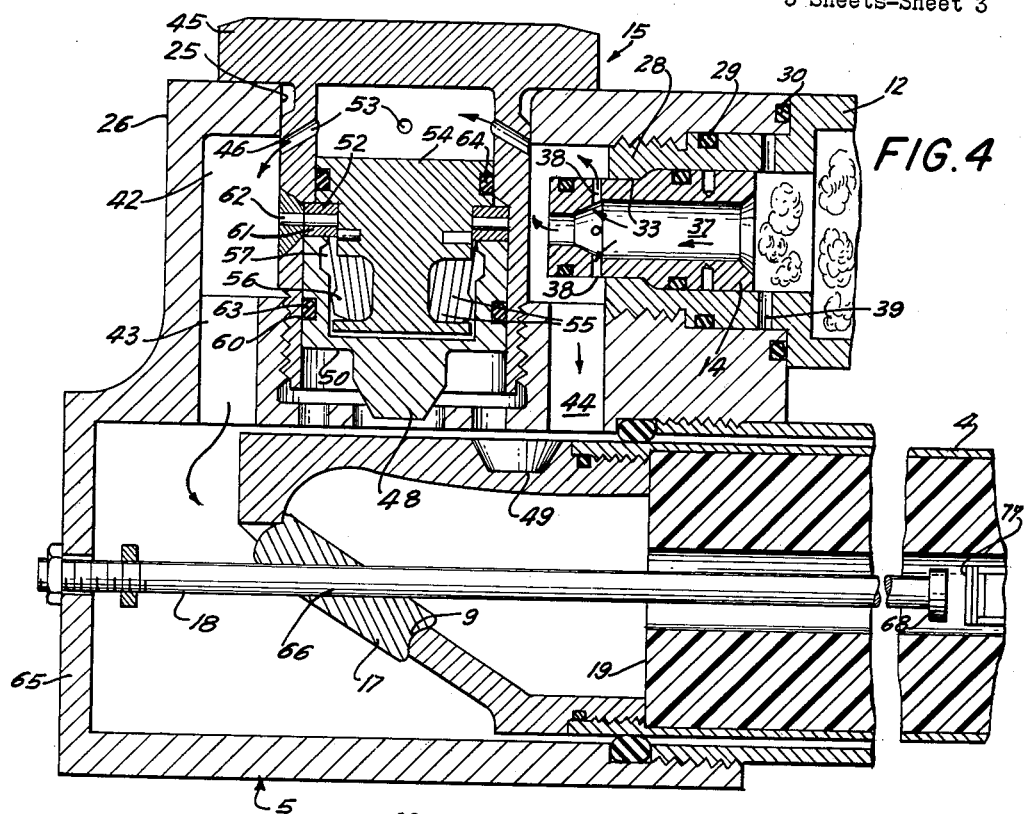
FIGURE 4 is a sectional view of the rearward end of the catapult casing, similar to FIGURE 3, and showing the locking device operated to releasing position, the flow control device actuated and the rocket engine being propelled by gas flowing from the gas generator.

A stripper 18 of any suitable construction is mounted on the rearward wall 65 of the catapult casing 5. In the illustrated embodiment the stripper 18 comprises a rod having its rearward end extending through and attached to the rearward wall 65. The strip rod 18 extends forwardly from the wall 65 through a hole 66 in the closure 17 for the nozzle 9 and into the rocket engine 4 and, more specifically, into the annular opening 67 in the propellant material 17. The inner end of the strip rod 18 is provided with an enlarged head 68, as shown in FIGURES 3 and 4.

The igniter 16 comprises a cylinder sleeve 69 mounted fast to the attached end of the rocket engine at the axis of a recess 70 and has ports 71 opening into the recess. Mounted to slide in the cylinder sleeve 69 is a piston 72 having a firing pin 73 at its inner side which operates in the manner of a hammer in fire arms. Adjacent to the firing pin 73 is a percussion cap 74 in intimate contact with a primer material 75 which, in turn, has access to flammable powder 76. The flammable powder 76 is contained in a perforate cylinder 77 through which the flame escapes to ignite the propellant material 17 for the rocket engine. The piston 72 of the igniter 16 is restrained by a pin 78 which is sheared by high-pressure gas to operate piston 72 to ignite the propellant material 17. One form of the invention having now been described in detail, the mode of operation is next explained.

When the pilot wishes to be ejected, he presses the button 20 at the side of his seat, which closes an electric circuit to ignite the material in the gas generating chamber 12. Gas from the gas generator 12, see FIGURE 3, flows through the flow control device 14 and into the annular chamber 42 surrounding the locking device 15. The gas then flows from the chamber 42 through the ports 43 and 44 to the cylindrical port 24 to act on the piston 50 of the locking device and simultaneously through the ports 53 into the chamber overlying the piston 54. The pressure of the gases acting on the piston 54 shears the pins 62 to cause the piston 54 to move downward relative to ring 61 and piston 50 until the flange 59 is positioned below the tangs 55, as illustrated in FIGURE 4. Immediately upon release of the tangs 55, the shoulder of the piston 54 engages the ring 61 and shears the shear pin 62 extending into the wall of the shank 46. This downward force of the piston 54 relative to the piston 50 causes the enlarged ends 56 of the tangs 55 to be cammed inwardly into the annular space 60 in the piston 54 which releases the piston 50. The pressure acting on the larger surface of the piston 50 then moves the latter, together with the piston 54, from the position illustrated in FIGURE 3 to that illustrated in FIGURE 4. Such upward movement of the piston 50 withdraws the locking bolt 48 from the keeper groove 49 in the rocket engine.

Figure 5:
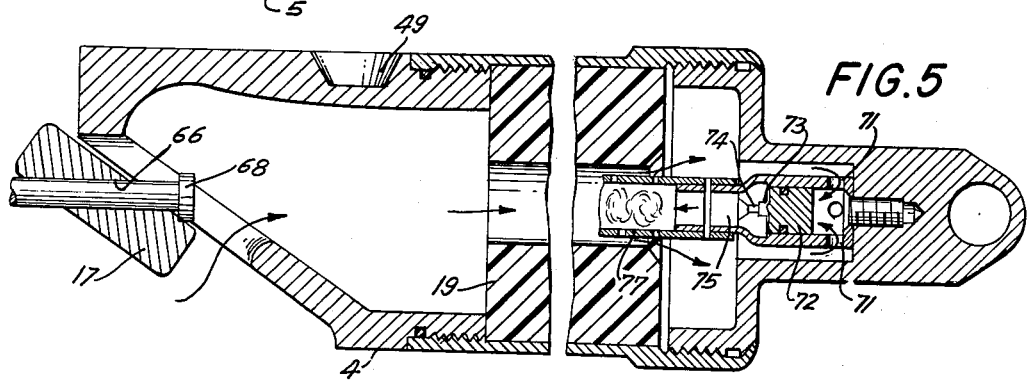
FIGURE 5 is a view of the rearward end of the rocket engine as it is being propelled and showing the nozzle closure being stripped from the rocket engine.

As soon as the locking bolt 48 has been withdrawn, the high-pressure gases from the gas generator 12 acting on the rearward end of the rocket engine 4 and closure 17 for the nozzle 9, which together act as a piston, propel the rocket engine from the catapult casing 5. As the rocket engine 4 moves outwardly from the catapult casing 5, the stripper 18 slides in the hole 66 in the closure plate 17 until the latter engages the head 68 at the end of the rod which then strips the closure from the nozzle as illustrated in FIGURE 5. This stripping off of the closure plate 17 occurs just prior to the separation of the nozzle end of the rocket engine 4 from the catapult casing 5, as illustrated in FIGURE 2–C.

Immediately upon stripping the closure 17 from the nozzle 9, the high-pressure gases enter the rocket engine and produce a shock wave which is transmitted through the axial opening in the propellant material 19 to the righthand end of the rocket engine, as viewed in FIGURE 5. The high-pressure gases then enter the cylindrical sleeve 69 through the radial port openings 71 and act on the hammer-like piston 72. The pressure shock wave acting on piston 72 causes it to shear the shear pin 78 and move the piston and firing pin 73 toward the percussion cap 74. Engagement of the firing pin 73 explodes the percussion cap 74 which, in turn, ignites the primer material 75 and flammable powder 76. Powder 76 burns and projects its flame through the perforation in cylinder 77 to ignite the propellant 19 for the rocket engine.

Thus, the propellant material 19 is ignited just prior to the ejection of the nozzle end of the rocket engine from the catapult. Thus, the rocket engine 4 is self-propelled immediately upon leaving the catapult casing 5. As explained above, the nozzle 9 is directed downwardly and rearwardly to propel the pilot and his seat forwardly and upwardly so that it will clear the aircraft 1 before it starts to descend.

It will now be observed that the present invention provides a system for igniting a rocket engine as it is launched from a catapult and which is actuated by the pressure of the gases used to operate the catapult. It will further be observed that the present invention provides an ignition system for a catapult-propelled rocket engine which is inherently automatic and self-determined and having an extremely high order of reliability. It will further be observed that the present invention provides an improved construction in a catapult for launching a rocket engine which automatically opens the nozzle of the rocket engine after it has moved a predetermined distance in the catapult to subject the igniting device to the pressure of the propelling gas in the catapult. It will still further be observed that the present invention provides an ignition system of the type indicated which is of relatively simple and compact construction, economical to manufacture and safe to operate.

While a single embodiment of the invention is herein described and illustrated, it will be understood that changes may be made in the construction and arrangement of elements without departing from the spirit or scope of the invention. Therefore, without limitation in this respect, the invention is defined by the following claims.

I claim:

1. Ejecting apparatus comprising a frame from which an object is to be ejected, a catapult casing on the frame, a rocket engine in the catapult casing and connected to the object to be ejected, said rocket engine containing a propellant and having a nozzle at one end and a pressure responsive ignition means therein, a removable closure in the nozzle which together with the end of the rocket engine constitutes a piston in the catapult casing, locking means in the casing for locking engagement directly with the rocket engine, means connecting the removable nozzle closure and the casing for stripping the closure from the nozzle upon movement of the rocket engine a predetermined distance along the catapult casing, a gas generator for producing gas under pressure, means connected to said gas generator to deliver gas to the locking means and catapult casing at the exterior of the rocket engine to operate the locking means and propel the rocket engine along the catapult casing until the closure is stripped, said gas entering the interior of the rocket engine through the nozzle when the closure is stripped therefrom to produce a pressure therein and initiate the pressure responsive ignition means in the rocket engine, and means responsive to the pressure in the gas generator for controlling the generation of gas.

2. Ejecting apparatus comprising a frame from which an object is to be ejected, a catapult casing on the frame, a rocket engine in the catapult casing and connected to the object to be ejected, said rocket engine containing a solid propellant and having a nozzle at one end and a pressure operated ignition means therein, a removable closure in the nozzle which together with the end of the rocket engine provides a piston in the catapult casing, means connected to the closure and casing for stripping the closure from the nozzle during movement of the rocket engine along the catapult casing, a gas generator for producing gas under pressure to propel the rocket engine along the catapult casing for stripping the closure from the nozzle, said gas entering the rocket engine through the nozzle when the closure is stripped therefrom to produce a pressure in the interior of the engine to initiate operation of the ignition means, and means responsive to the pressure in the gas generator for controlling the generation of gas.

3. Ejecting apparatus comprising a frame from which an object is to be ejected, a catapult casing on the frame, a rocket engine in the casing and connected to the object to be ejected, said rocket engine containing a solid propellant and having a nozzle at one end and a pressure operated ignition means therein, said ignition means being located in the rocket engine in open communication with the nozzle and solid propellant and operable in response to an increase in pressure therein, a removable closure at the rear of the rocket engine constituting a piston in the catapult casing, locking means on the casing for locking engagement with the rocket engine, means in the casing for engaging and stripping the closure and opening the nozzle upon movement of the rocket engine a predetermined distance along the catapult casing, a gas generator for producing gas under pressure, means connected to said gas generator to deliver said gas under pressure to the locking means and casing at the rear of said closure to operate the locking means to releasing position, propel the rocket engine in the catapult casing until the closure is stripped and supply the pressure required to operate the ignition means for the rocket engine whereby one source of gas performs all of the functions required to eject a rocket engine from its catapult casing and ignite the solid propellant therein.

4. Apparatus for controlling the firing of a rocket engine comprising a frame, a catapult casing attached to said frame, a rocket engine in the casing and containing a propellant, said rocket engine having a nozzle at one end and a pressure operated ignition means therein, said ignition means being located in the rocket engine in open communication with the nozzle and operable in response to an increase in pressure therein to ignite the propellant, a supply of gas under pressure, and means for delivering said gas to the casing at the exterior of the rocket engine to propel the latter from the casing, and means operated by the movement of the rocket engine from the casing for controlling the delivery of the propellant gas into the interior of the rocket engine to produce a pressure in the rocket engine for operating the ignition means to ignite the propellant.

5. Ejecting apparatus comprising a frame from which an object is to be ejected, a catapult casing on the frame, a rocket engine in the catapult casing having a central bore and a solid propellant surrounding the bore, said rocket engine having a nozzle at one end and an ignition means at the opposite end operable in response to pressure to ignite the propellant, a gas generator for producing gas under pressure means connected to the gas generator for delivering the generated gas to the catapult casing under pressure for operating the catapult to eject the rocket engine, and means for controlling the delivery of gas from the catapult casing into the rocket engine to produce a pressure wave which is transmitted through the nozzle and central bore of the rocket engine to operate the ignition means for igniting the propellant.

6. Ejecting apparatus comprising a frame from which an object is to be ejected, a catapult casing on the frame, a rocket engine in the catapult casing having a central bore with a solid propellant surrounding the bore, said rocket engine having a nozzle at one end and an ignition means at the opposite end operable responsive to pressure to ignite the propellant, a closure in the nozzle which together with the end of the rocket engine provides a piston in the catapult casing, means connected between the catapult casing and closure for stripping the closure from the nozzle during movement of the rocket engine along the casing, a gas generator for producing gas under pressure, and means connected to the gas generator for delivering the gas from the generator to the catapult casing to propel the rocket engine along the casing until the nozzle closure is stripped and produce a pressure wave through the axial bore of the rocket engine after the closure is stripped from the nozzle to operate the ignition means for igniting the propellant.

7. Ejecting apparatus in accordance with claim 6 in which the means for stripping the closure from the nozzle comprises a rod fixed to the catapult casing and extending through the closure, and said rod having a head at its end engaged by the closure during the movement of the rocket engine along the catapult casing.

8. Ejecting apparatus in accordance with claim 6 in which the ignition means comprises a piston hammer operated by the pressure wave, a percussion cap exploded by the hammer, a primer material ignited by the percussion cap, and a flammable powder ignited by the primer material for igniting the propellant charge.

9. An ejecting apparatus in accordance with claim 8 in which the flammable powder is contained in a casing positioned axially in the bore in the rocket engine in spaced relation to the propellant charge and having perforations through which the flame passes to ignite the propellant charge.

10. Ejecting apparatus for ejecting a pilot's seat from an aircraft comprising a rocket engine extending along the back of the seat and connected thereto, said rocket engine having a nozzle at one end directed downwardly and rearwardly at an angle to the vertical, at least the lower end of the rocket engine being enclosed in a catapult casing fixed to the aircraft, a closure in the nozzle which together with the end of the rocket engine provides a piston in the catapult casing, a gas generator, means connecting the gas generator and catapult casing for directing gas from the gas generator to the casing to propel the rocket engine longitudinally of the casing, means connecting the catapult casing and closure to strip the closure from the nozzle of the rocket engine after a predetermined movement of the latter along the casing, said gas under pressure entering the interior of the rocket engine through the nozzle, and ignition means in the rocket engine responsive to the pressure of the gas entering through the nozzle to ignite the propellant charge.

11. Ejecting apparatus in accordance with claim 10 in which the stripping means comprises a rod extending through the closure and having a head engaged by the closure during its movement along the catapult casing.

References Cited in the file of this patent

UNITED STATES PATENTS

| | | |
|---|---|---|
| 2,515,049 | Lauritsen et al. | July 11, 1950 |
| 2,552,497 | Roach et al. | May 8, 1951 |
| 2,627,810 | Catlin | Feb. 10, 1953 |
| 2,773,448 | Jasse | Dec. 11, 1956 |
| 2,900,150 | Hirt et al. | Aug. 18, 1959 |
| 2,937,830 | Fulton | May 24, 1960 |
| 2,954,947 | Zabelka et al. | Oct. 4, 1960 |
| 2,998,213 | Pitts | Aug. 29, 1961 |
| 3,055,619 | MacDonald et al. | Sept. 25, 1962 |

FOREIGN PATENTS

| | | |
|---|---|---|
| 758,212 | Great Britain | Oct. 3, 1956 |
| 1,029,282 | France | Mar. 4, 1953 |

OTHER REFERENCES

Aviation Week Magazine, Nov. 12, 1956; pages 71, 72, 74, and 77.